US007060439B2

(12) United States Patent
Gordon

(10) Patent No.: US 7,060,439 B2
(45) Date of Patent: Jun. 13, 2006

(54) SOLID-PHASE CHEMICAL ANALYSIS USING ARRAY HYBRIDIZATION FACILITATED BY AGITATION DURING CENTRIFUGING

(75) Inventor: Gary B. Gordon, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/010,020

(22) Filed: Dec. 5, 2001

(65) Prior Publication Data

US 2002/0052042 A1 May 2, 2002

Related U.S. Application Data

(63) Continuation of application No. 09/590,934, filed on Jun. 8, 2000, now Pat. No. 6,361,486, which is a continuation-in-part of application No. 09/514,975, filed on Feb. 29, 2000, now Pat. No. 6,309,875, application No. 10/010,020, which is a continuation of application No. 09/971,867, filed on Oct. 4, 2001, now abandoned, which is a continuation of application No. 09/514,975.

(51) Int. Cl.
*C12Q 1/68* (2006.01)
*C12M 1/36* (2006.01)
*G01N 15/06* (2006.01)
*C07H 21/04* (2006.01)

(52) U.S. Cl. ............................ 435/6; 435/7.1; 435/174; 435/183.1; 435/287.2; 536/23.1; 422/68.1

(58) Field of Classification Search ................ 435/4, 435/6, 7.1, 174, 283.1, 287.2
See application file for complete search history.

(56) References Cited

U.S. PATENT DOCUMENTS

| 3,211,368 | A |   | 10/1965 | Shanley |
|---|---|---|---|---|
| 3,420,436 | A |   | 1/1969 | Yoichiro |
| 4,162,761 | A |   | 7/1979 | Ito |
| 4,812,294 | A | * | 3/1989 | Combs .......................... 422/72 |
| 5,380,662 | A | * | 1/1995 | Robbins et al. ........... 435/303.1 |
| 5,449,621 | A | * | 9/1995 | Klein ........................... 436/45 |
| 5,527,681 | A | * | 6/1996 | Holmes ......................... 435/6 |
| 5,834,758 | A | * | 11/1998 | Trulson et al. ............. 250/201.2 |
| 6,258,593 | B1 | * | 7/2001 | Schembri et al. ......... 435/287.2 |
| 2002/0001803 | A1 | * | 1/2002 | Smith et al. .................... 435/6 |
| 2002/0001839 | A1 | * | 1/2002 | Schembri et al. ......... 435/287.2 |

FOREIGN PATENT DOCUMENTS

| EP | 0160901 A2 | 4/1985 |
|---|---|---|
| EP | 1129783 A2 | 2/2001 |
| GB | 2349108 A | 12/1999 |

* cited by examiner

Primary Examiner—BJ Forman

(57) ABSTRACT

Array hybridization can be facilitated by agitating a reaction cell subject to centrifugal force greater than 1 G. A two-dimensional hybridization array is preferably oriented generally orthogonal to the centrifugal force. Agitation involves titling the array back and forth about an axis, preferably parallel to a centrifuge axis. The centrifugal force serves, in a sense, as supergravity helping to overcome non-specific binding forces (viscous forces and other forces at the liquidsolid boundary) that limit the rate of liquid flow. Thus, the agitation rate and the related replenishment rate can be increased. The agitation causes the sample liquid to wash back and forth across the array, which remains protected by a thin liquid film. The resulting "tidal" motion, results in thorough mixing of the sample liquid. In addition, since only a thin film is required over much of the array, typically costly sample volume can be reduced. Thus, faster hybridization with lower sample volumes can be achieved.

5 Claims, 4 Drawing Sheets

SOLID-PHASE CHEMICAL ANALYSIS USING ARRAY HYBRIDIZATION FACILITATED BY AGITATION DURING CENTRIFUGING

CROSS REFERENCE TO RELATED APPLICATION(S)

This is a continuation of application Ser. No. 09/590,934 filed on Jun. 8, 2000 now U.S. Pat. No. 6,361,486 which is a Continuation-In-Part of application Ser. No. 09/514,975 filed on Feb. 29, 2000 now U.S. Pat. No. 6,309,875. This application is a continuation of Ser. No. 09/971,867 filed on Oct. 4, 2001 now abandoned, which is a continuation of Ser. No. 09/514,975 filed on Feb. 29, 2000. All of the aforementioned applications are hereby Incorporated by reference in their entireties.

BACKGROUND OF THE INVENTION

The present invention relates generally to solid-phase chemistry and, more particularly, to chemical and biochemical reactions between a molecules bound to a substrate surface and molecules in a liquid, as in array hybridization. A major objective of the present invention is to provide for more rapid array hybridization.

Solid-phase chemistry involves chemical or biochemical reaction between components in a fluid and molecular moieties present on a substrate surface. Solid-phase chemical reactions can involve: the synthesis of a surface-bound oligonucleotide or peptide, the generation of combinatorial "libraries" of surface-bound molecular moieties, and hybridization assays in which a component present in a fluid sample hybridizes to a complementary molecular moiety bound to a substrate surface.

Hybridization reactions between surface-bound molecular probes and target molecules in a sample liquid may be used to detect the presence of particular biomaterials including biopolymers and the like. The surface-bound probes may be oligonucleotides, peptides, polypeptides, proteins, antibodies or other molecules capable of reacting with target molecules in solution. Such reactions form the basis for many of the methods and devices used in the new field of genomics to probe nucleic acid sequences for novel genes, gene fragments, gene variants and mutations.

The ability to clone and synthesize nucleotide sequences has led to the development of a number of techniques for disease diagnosis and genetic analysis. Genetic analysis, including correlation of genotypes and phenotypes, contributes to the information necessary for elucidating metabolic pathways, for understanding biological functions, and for revealing changes in genes that confer disease. New methods of diagnosis of diseases, such as AIDS, cancer, sickle cell anemia, cystic fibrosis, diabetes, muscular dystrophy, and the like, rely on the detection of mutations present in certain nucleotide sequences. Many of these techniques generally involve hybridization between a target nucleotide sequence and a complementary probe, offering a convenient and reliable means for the isolation, identification, and analysis of nucleotides.

In biological chip or "biochip" arrays, a plurality of probes, at least two of which are different, are arranged in a spatially defined and physically addressable manner on a substrate surface. Such "biochip" arrays have become an increasingly important tool in the biotechnology industry and related fields, as they find use in a variety of applications, including gene expression analysis, drug screening, nucleic acid sequencing, mutation analysis, and the like. Substrate-bound biopolymer arrays, particularly oligonucleotide, DNA and RNA arrays, may be used in screening studies for determination of binding affinity and in diagnostic applications, e.g., to detect the presence of a nucleic acid containing a specific, known oligonucleotide sequence.

Regardless of the context, all chemical or biochemical reactions between components in a fluid and molecular moieties present on a substrate surface require that there be adequate contact between the fluid's components and the surface-bound molecular moieties. To this end, a number of approaches have been proposed to facilitate mixing of fluid components during solid phase chemical or biochemical reactions so that a substantially homogeneous fluid contacts the reactive surface. Most recently, a great deal of attention has focused on improving hybridization assays using various mixing techniques.

Inadequate mixing is a particular problem in chemical and biological assays where very small samples of chemical, biochemical, or biological fluids are typically involved. Inhomogeneous solutions resulting from inadequate mixing can lead to poor hybridization kinetics, low efficiency, low sensitivity, and low yield. With inadequate mixing, diffusion becomes the only means of transporting the reactants in the mobile phase to the interface or surface containing the immobilized reactants. In such a case, the mobile phase can become depleted of reactants near the substrate as mobile molecules become bound to the immobile phase. Also, if the cover is not exactly parallel to the plane of the substrate, the height of the fluid film above the probe array will vary across the array. Since the concentration of target molecules will initially be constant throughout the solution, there will be more target molecules in regions where the film is thicker than in regions where it is thinner, leading to artifactual gradients in the hybridization signal.

As array density is ever increasing, and the need for faster and more accurate hybridization assays is ongoing, there is currently a great deal of emphasis on improving "mixing" of sample liquid during hybridization and, correspondingly, in maximizing contact between the components of the sample liquid and the entirety of the array surface.

The Affymetrix GeneChip® Fluidics Station hybridization and wash instrument includes a means for pumping a sample liquid back and forth across an array on a substrate surface while the substrate is mounted in a holder. While this method provides for mixing of components within the sample liquid, there are disadvantages that can adversely affect the accuracy of the hybridization reaction. That is, the method is prone to contamination because of the number and variety of materials that come into contact with the sample liquid, i.e., adhesives, various plastic components, and the like. In addition, large sample volumes (greater than 200 microliters (μl) are required, and temperature control is poor.

In U.S. Pat. No. 4,849,340 to Oberhardt, an alternative means is disclosed for mixing components in a fluid during an assay performed in an enclosed chamber. Oberhardt discloses an apparatus comprising a base, an overlay and a cover which when combined define a sample well, a channel, and a reaction space. Fluids introduced into the sample well flow by capillary action to the reaction space. Mixing of fluids within the reaction space is effected using mechanical or electromechanical means to create forced convection currents. Again, large sample volumes are required (100 to 200 μl) because of the need to maintain a gap between the base and the cover during mixing. Additionally, the method relies on capillary action to promote fluid flow, and mixing may thus be slow and incomplete, particularly when viscous reagents are used.

U.S. Pat. No. 5,192,503 to McGrath et al. discloses an apparatus for conducting an in situ assay of a tissue section mounted on a slide. A seal member, mounted on a plate, forms a closed periphery and encloses and defines an interior region on the slide that forms a reaction chamber. A plate covers the slide and seal member. The joined plate and slide together form a probe clip. The reaction chamber may comprise a single chamber or two chambers. In the one-chamber embodiment a time-release material, such as gelatin, is applied over the probe, allowing time for reaction of the tissue sample with reagents before the probe is released and thus able to react with the tissue sample.

In the two-chamber embodiment, the probe reaction chamber defined by the closed periphery of a first seal member is divided into two regions by a raised portion of the plate, a mixing chamber and a reaction chamber. At least one end of this raised portion does not contact the first seal member, thereby leaving a channel available for fluid flow. Probe compounds placed in the mixing chamber do not mix with the fluid reagents in the reaction chamber until fluid is induced to flow between the two chambers via a channel in a gap left between the raised portion and the seal member. Fluid flow may be induced by rotating the probe clip to a substantially vertical orientation, allowing fluid reagents from the reaction chamber to flow into the mixing chamber and mix with the probe compounds. Reorienting the probe clip to the horizontal causes the mixed probe and fluid reagent to flow to the reaction chamber for reaction with a tissue section therein. Thus, the position and flow of fluid reagents and probes in the reaction chamber and the mixing chamber is controlled by gravity. Optionally, both gravity-controlled flow and use of a time-release agent such as gelatin may be used at the same time to regulate the mixing of reagent fluids and probes. Like the Oberhardt device, the McGrath et al. apparatus is disadvantageous when viscous solutions are used or rapid mixing is required, insofar as mixing depends upon gravity to induce flow.

A method for more thorough mixing of components in a sample liquid during a solid phase chemical or biochemical reaction is disclosed in commonly assigned, co-pending U.S. patent application Ser. No. 09/343,372 to Schembri et al., filed Jun. 30, 1999 ("Apparatus and Method for Conducting Chemical or Biochemical Reactions on a Solid Surface Within an Enclosed Chamber"). That method involves mixing a very thin film of fluid in a chamber, wherein an air bubble is incorporated therein and, when used in hybridization, a surfactant is preferably present as well. However, non-specific binding between the sample liquid and reaction cell surfaces, as well as liquid viscosity limit the rate the air bubble can be moved in the reaction cell. This in turn limits the rate at which mixing can occur, and thus the hybridization rate.

In a coassigned U.S. patent application Ser. No. 09/357,440, filed Jul. 20, 1999. The use of a centrifuge is disclosed to reduce non-specific fluid surface effects. In this case, a reaction cell is agitated about an axis along the centrifugal force. While this approach offers certain improvements in the amount of sample required for hybridization and in hybridization rates, further advances are desired. What is needed is a system and method that provides for faster hybridization and smaller sample volumes.

SUMMARY OF THE INVENTION

The present invention facilitates solid-phase chemical, e.g., affinity, reactions as of a sample liquid to a probe array by agitating the sample liquid while under the influence of a centrifugal force greater than 1 G, the gravitation force at Earth's surface. The supergravity centrifugal force is more effective than normal gravity in overcoming the resistance imposed by liquid viscosity and non-specific binding forces to liquid flow. By permitting faster liquid flow, the invention can achieve higher replenishment rates and thus faster hybridization.

Preferably, the agitation involves rotation about an agitation axis that is more orthogonal to than along the centrifugal force. More specifically, the agitation axis can be more parallel than not (i.e., deviates at most 45° from parallel) to the centrifuge axis. If the agitation axis is along or nearly along the centrifugal force, the sample liquid churns in circles parallel to the array. The preferred agitation axes provide for tidal (i.e., periodic ebb and flow) motion of the sample liquid in which much of the array is alternately covered only by a thin liquid film and then replenished by a thick wave of sample liquid.

Also, preferably, the array is two-dimensional is more orthogonal than not to the centrifugal force. When the array is orthogonal to the centrifugal force, the centrifugal force urges sample liquid against the array. Of course, the agitation involves deviations from orthogonality, and unless the array is appropriately curved, the centrifugal force is not orthogonal to the array everywhere on the array. Nonetheless, averaged over time and the array, the centrifugal force is preferably nearly orthogonal to the array.

In a preferred realization of the invention, the two-dimensional array is (on average) orthogonal to the centrifugal force and the agitation axis is parallel to the centrifuge axis. The agitation involves periodic reversals in the direction of agitation rotation, further emulating tidal action. The centrifuge period (corresponding to a 360° rotation of a centrifuge rotor) is preferably greater, and typically much greater, than the agitation period (which includes two reversals of agitation direction). In analogy with gravity (instead of centrifugally) driven motion, the array can be considered as rocking teeter-totter fashion about a position parallel to Earth's surface. In this realization, once hybridization is completed, the reaction cell (and thus the probe array) can be rotated, e.g., inverted, about the agitation axis for spin drying using centrifugal action.

A major advantage of the present invention is that it provides for a relatively high replenishment rate, as well as a relatively effective tidal replenishment motion. Thus, the invention can provide for rapid hybridization. In addition, the invention can make efficient use of sample liquid, which is usually costly, time-consuming to produce and/or of limited availability. These and other features and advantages of the invention are apparent from the description below with reference to the following drawings.

DESCRIPTION OF THE PREFERRED EMBODIMENTS

Figure 1:
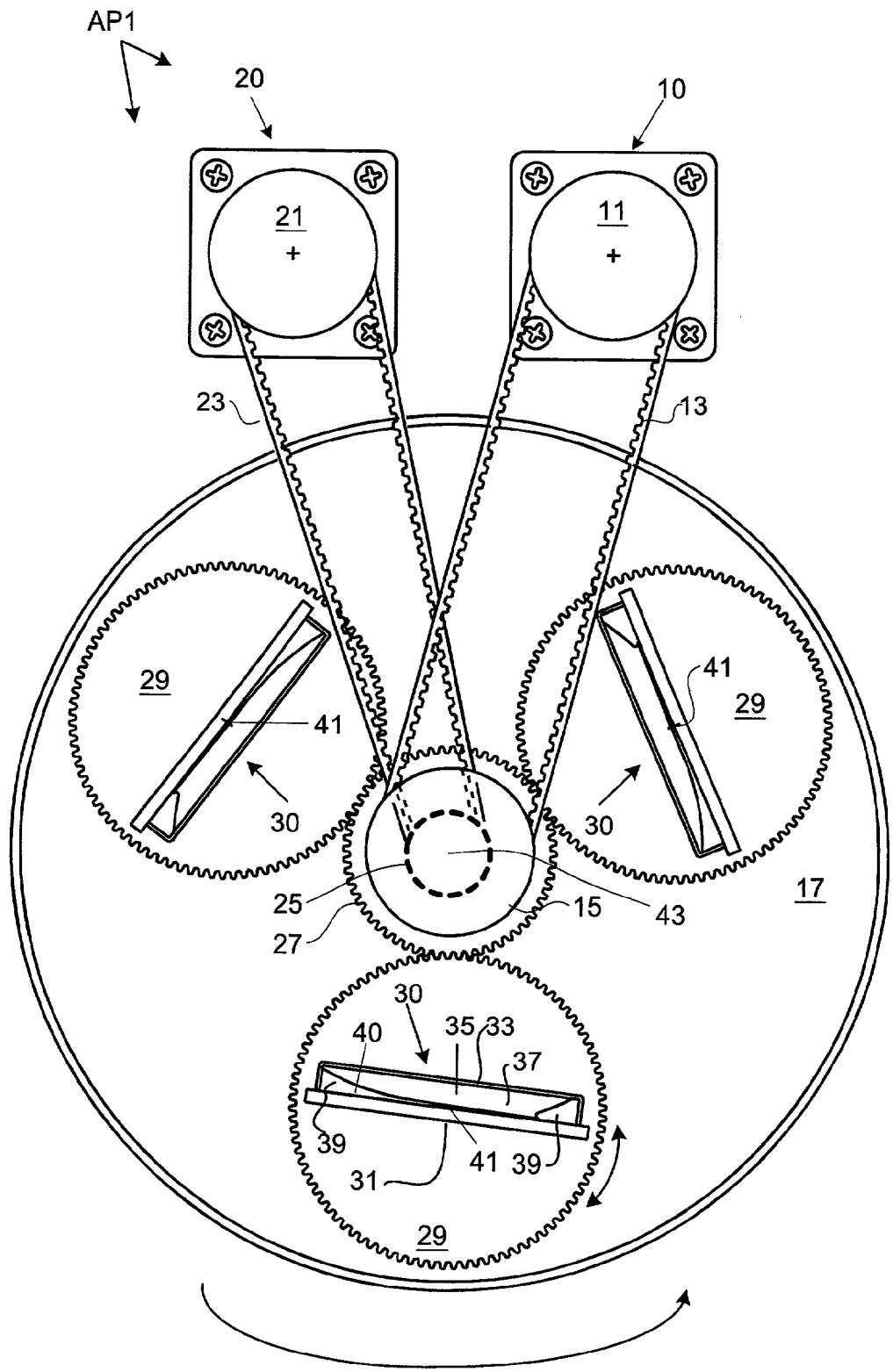
FIG. 1 is a schematic plan view of an array hybridization system with a first set of reaction cells in accordance with the present invention.

An array-hybridization system AP1 in accordance with the present invention is shown in FIG. 1. System AP1 comprises a centrifuge subsystem 10 and an agitation subsystem 20. Centrifuge subsystem 10 includes a centrifuge motor 11, a centrifuge drive chain 13, a centrifuge drive shaft 15, and a centrifuge rotor or "turntable" 17. Agitation subsystem 20 includes an agitation-drive motor 21, an agitation-drive chain 23, an agitation-drive shaft 25, an agitation-drive gear 27, and three agitation-drive mounts 29. Agitation-drive mounts 29 are rotatably coupled to turntable 17. Each agitation-drive mount 29 holds a reaction cell 30.

Reactions cells 30 are similar so the following description of any one is representative. A reaction cell 30 includes a substrate 31 and a cover 33 so as to define a 2 cm×2 cm×0.25 mm interior volume or "reaction chamber" 35. (In the figures, the thickness of reaction cell 30 is exaggerated for clarity.) During hybridization, this interior volume is partially filed with sample liquid 39, with the remainder of the cell interior volume being filled with gas 37, e.g., dry air or nitrogen. A hybridization array 40 with 10,000 probes arranged in a 100×100 array is defined on substrate 31 on the side contacted by sample liquid. Two septa (not shown) in each cover 33 permit fluid to be introduced and removed from reaction cell 30.

Motors 11 and 21, which are both servo motors, are located below turntable 17. Agitation drive shaft 25 and centrifuge drive shaft 15 are coaxial, with agitation drive shaft 25 extending though a hollow centrifuge shaft 15. Centrifuge drive shaft 15 is rigidly coupled to turntable 17. Agitation drive shaft 25 is rigidly coupled to agitation drive gear 27, which is engaged with the teeth of mounts 29.

Mounts 29 are rotatably coupled to turntable 17 about respective agitation axes 41 Each agitation axis 41 extends parallel to a centrifuge axis 43 (through shafts 15 and 25). Each agitation axis 41 extends though a respective reaction cell, nearly bisecting the respective hybridization array 40. Each agitation axis 41 is spaced 10 cm from the centrifuge axis 41.

Centrifuge motor 11 determines the rotation rate of turntable 17. The gear ratio of centrifuge drive motor to turntable drive shaft 15 is 1:1, so that the rotation rate of turntable 17 is the same as the rotation rate for motor 11. The gear ratio of agitation drive motor 21 to agitation drive shaft is 2:1, and the gear ratio of mount 29 to agitation drive gear 27 is 3:1. When there is no agitation, agitation motor 21 rotates at exactly half the rate of centrifuge motor 11. To effect agitation, the rotation rate of agitation motor 21 is increased and decreased in a controlled manner so that it alternately leads and lags centrifuge motor 11 in phase. Both motors 11 and 21 are driven cooperatively by a servo-controlled unit such as manufactured by Galil in Sunnyvale, Calif. Alternatively, the invention provides for other means for achieving the described agitation and centifugation.

Generally, centrifugal forces much greater than the local gravitational field are desired to overcome non-specific liquid surface binding forces. Turntable 17 can be rotated at 1000 revolutions per minute (RPM), to achieve a centrifugal force of 112 G. Much higher forces are readily achievable. For example, at 3000 RPM, a centrifugal force of 1004 G is achieved.

The agitation amplitude is selected to be about ±6 ° to effect full "sloshing" of the sample liquid. The agitation rate depends on the sample liquid and the centrifugal force. A typical value would be a 5 Hz agitation, which would yield ten replenishments per second.

Figure 2A:
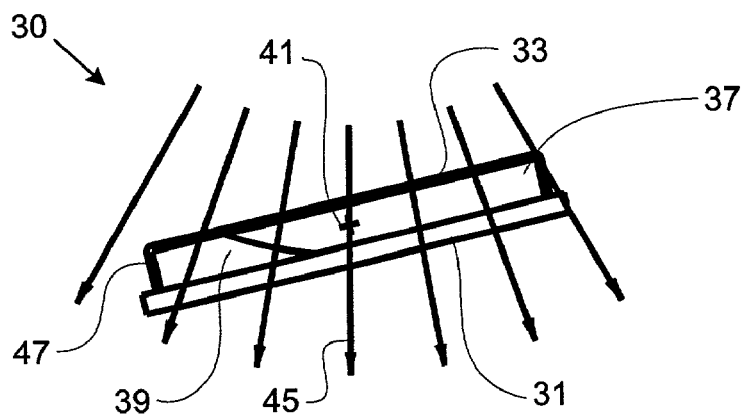
FIGS. 2A–2C show three orientations of a reaction cell of FIG. 1 being agitated in accordance with the present invention by the system of FIG. 1.

In FIG. 2A, reaction cell 30 is shown titled counterclockwise +6° relative to a central centrifugal force vector 45 at the beginning of an agitation cycle. (Agitation angles are exaggerated in FIGS. 2A–2C for clarity.) In this orientation, all sample liquid 39, other than a thin film, is at the end 47 shown to the left in FIGS. 2A–2C. The surface of sample liquid 39 in the static state represents a constant radius from centrifugal axis 43 (FIG. 1).

Figure 2B:
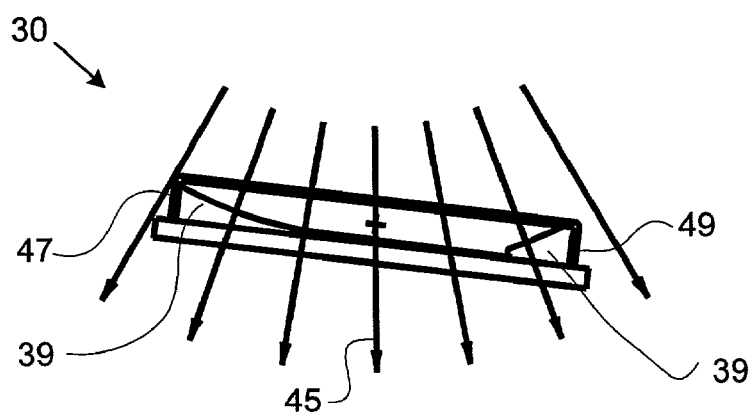

In FIG. 2B, reaction cell 30 has rotated clockwise past a level (orthogonal to a centrifugal force vector 45) orientation to a −2° clockwise orientation. In this orientation, some of the liquid has reached the opposite end 49 (to the right in FIGS. 2A–2C). Most of the remaining liquid is still at the clockwise end 47, while a tapered sheet of sample liquid 39 extends between the ends 47 and 49.

Figure 2C:
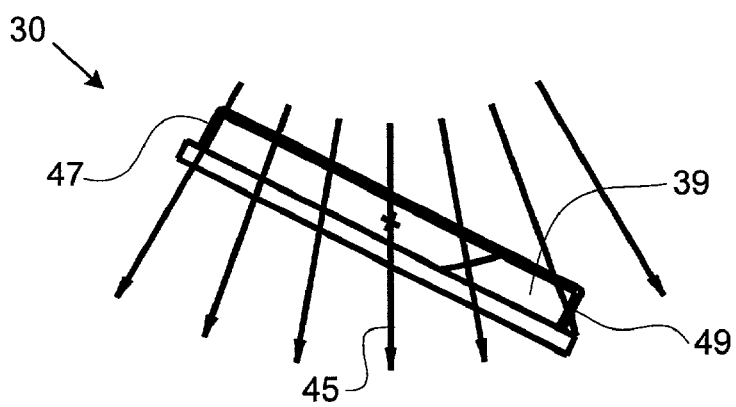

In FIG. 2C, reaction cell 30 has rotated to an extreme clockwise position at −6°. In this position, except for a thin film, sample liquid 39 is at the right end 49 of reaction cell 30. This completes the first half of an agitation cycle. The second half of the agitation cycle begins with the orientation of FIG. 2C and ends with the orientation of FIG. 2A. An intermediate orientation of +2° (counterclockwise) for the second half is shown in FIG. 3.

Figure 3:
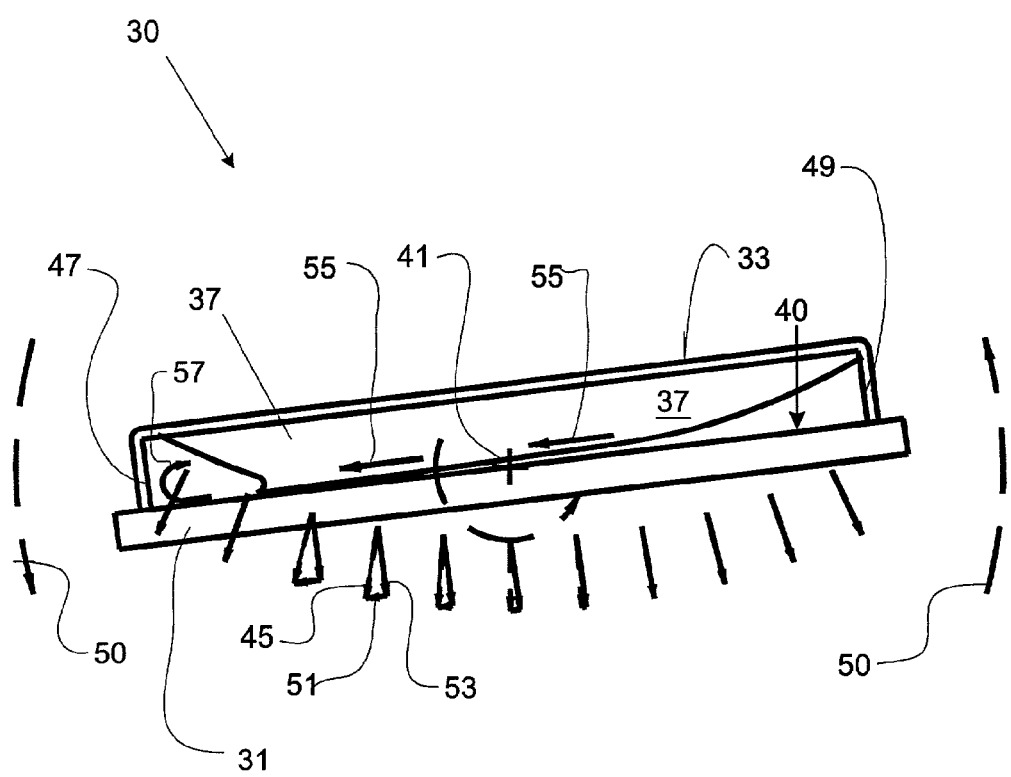
FIG. 3 shows a fourth orientation of the reaction cell of FIGS. 2A–2C.

In FIG. 3, reaction cell 30 is being rotated counterclockwise as indicated by arrows 50. Centrifugal force arrows 45 are shown broken into a component 51 along array 40 and a component 53 orthogonal to array 40. The component 51 along array 40 urges sample liquid 39 toward (left) end 47. This movement is indicated by arrows 55, which show a tapered liquid profile flowing toward (left) end 47. A curved arrow 47 shows a return motion for liquid sample 39. This return motion provides for highly desirably vertical mixing.

The vertical mixing assures that every target molecule spends some time close enough to array 40 for binding to occur. The centrifugal force 45 helps overcome the inertia of the liquid and its non-specific binding forces with the substrate so that a high agitation rate can be maintained. The advantages of the invention can be understood with the following, admittedly approximate, understanding of the hybridization process.

When the agitation rate is doubled, each target molecule is likely to be found half as far from a respective probe for half the time. When it is half as far, it is four times as likely to hybridize. However, the interval over which it can hybridize is half as long. Thus, in principle, doubling the agitation rate doubles the hybridization rate. This linear relationship applies until non-specific binding fluid forces prevent sample liquid from completing its motion across the array. The stronger the centrifugal force, the higher the agitation rate can be raised before this limiting consideration applies. Thus, the centrifuge rate can be increased until the forces involved adversely affect specific binding or threaten the integrity of the hybridized or non-hybridized species.

In FIG. 1, the agitation axes are parallel to the centrifuge axis and the hybridization arrays are generally orthogonal to the centrifugal force. In other embodiments, the hybridization arrays are also generally orthogonal to the centrifugal force, but the agitation axes are not parallel to the centrifuge axis. For example, the agitation axes can be circumferentially (in other words, "tangentially") oriented relative to the centrifuge axis.

Particularly with a circumferentially oriented agitation axis, but also other cases in which the array is orthogonal to the centrifugal force, the substrate can be curved cylindrically, for example, along a radius slightly less than (e.g., 90% of) the distance between the agitation axis and the centrifuge axis. In this case, the centrifugal force is more orthogonal to the array away from the array center and even at the extremes of the agitation motion. This provides a more uniform sample liquid distribution across the array, which in turn allows less sample liquid to be used without risking drying of the array. In addition, the agitation is gentler on the sample.

Reaction cells 30 of FIG. 1 are oriented so that arrays 40 generally orthogonal to the centrifugal force. Oblique orientations are also provided for. For example, reactions cells can be oriented so that they are more orthogonal to the centrifugal force than along it. However, reaction cells 530 of FIG. 4 represent another case in which reaction cells are oriented both along and orthogonal to the centrifugal force.

Figure 4:
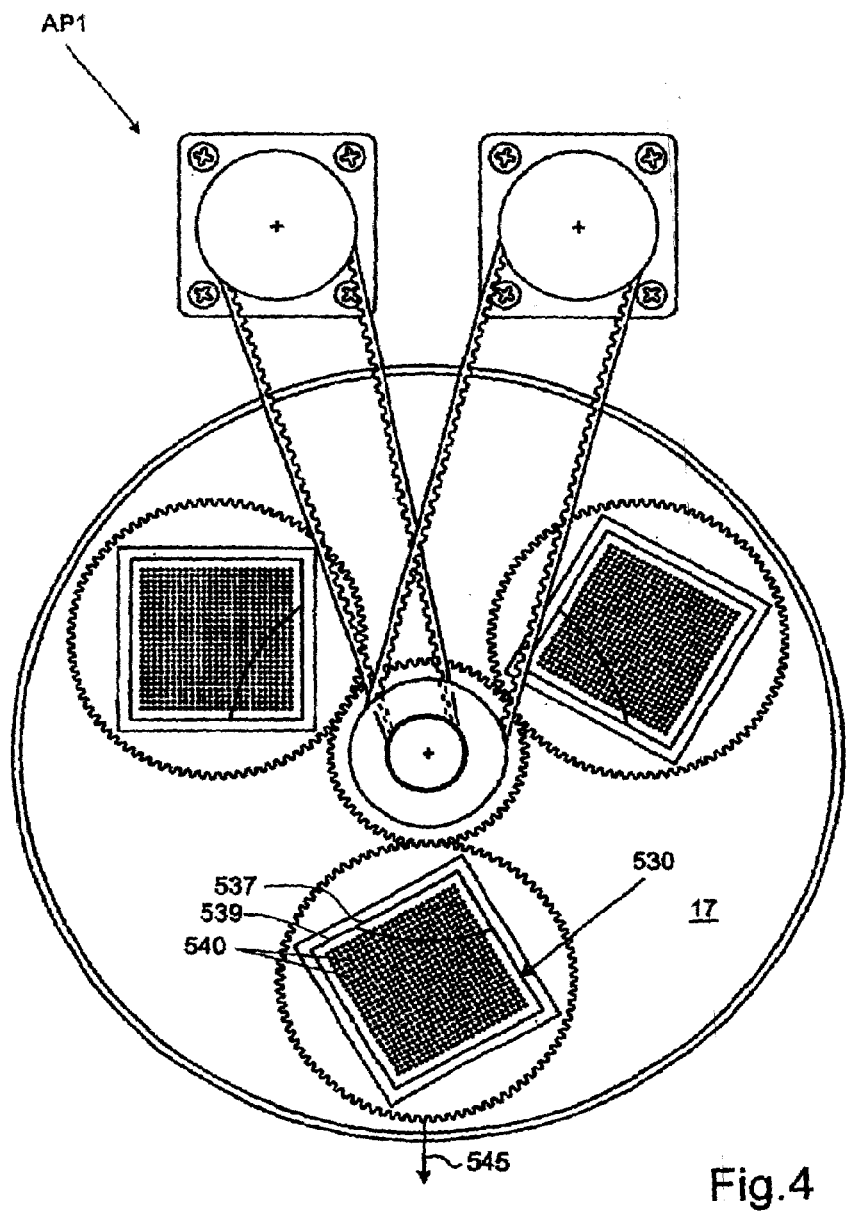
FIG. 4 shows the array hybridization system of FIG. 1 with a second set of reaction cells.

FIG. 4 shows system AP1 with reaction cells 530 oriented parallel to turntable 17. Reaction cells 530 are similar to reaction cells 30 and likewise include a probe array, in this case, probe array 540. Centrifugal force 545 urges sample liquid 549 radially outward, so that gas with cell 530 is radially inward of liquid 539. In this case, the agitation axis is perpendicular and through the center of array 540.

In greater detail with reference to FIG. 3, reaction cell 30 includes substrate 31 that preferably has a substantially planar surface, with at least a portion of the surface representing a reaction area (hybridization array 40) on which the chemical or biochemical reactions are conducted, and cover 33, optimally of plastic, having a peripheral lip which sealingly contacts the substrate surface about the reaction area, and wherein the cover and the reaction area of the substrate surface form an enclosure having an interior space that serves as the reaction chamber. The chamber is adapted to retain a quantity of fluid so that the fluid is in contact with the reaction area of the substrate surface and the inner surface of the cover.

The reaction cell also includes a fastening means (not shown) effective to press the cover and the substrate together, i.e., to immobilize the cover on the substrate, thereby forming a watertight, temporary seal therebetween. The fastening means ensures stable, effective and secure positioning of the cover over the substrate. Optional gasket means adjacent the surface of the cover may be included to aid in equalizing the pressure provided by the fastening means. The optional gasket may be, for example, placed between the cover and the rigid frame to provide compliance in the system and to even the pressure applied to the cover and the substrate. The apparatus further comprises fluid transfer means which enables introduction of fluid from the exterior of the apparatus to the reaction chamber, and removal therefrom. In a preferred embodiment, the fluid introduction means comprises one or more ports in the cover.

It is preferred that the cover be made of plastic and the substrate of glass, plastic, fused silica or silicon, the seal between plastic and either glass, plastic, fused silica or silicon being advantageous for producing the apparatus of the invention. The cover material should be thermally stable, chemically inert, and preferably non-stick. Furthermore, when the apparatus is used in hybridization, the cover should be comprised of a material that is chemically and physically stable under conditions employed in hybridization. In a preferred embodiment, the plastic cover is polypropylene, polyethylene or acrylonitrile-butadiene-styrene ("ABS"). In the most preferred embodiment, the plastic cover is comprised of polypropylene. The cover may be constructed by machining or molding technologies.

As noted above, the cover preferably has a lip along the perimeter of the cover bordering a recessed portion that comprises the major portion of the area of the inner face of the cover. Applying pressure to the outer face of the cover directly above the perimeter lip is required to form the tight seal between the cover and the substrate. Any means that presses the lip of the cover securely to the substrate is suitable. Such pressure may be applied evenly by, for example, clamps, a press, or by capturing the substrate and cover within a two-part rigid frame and compressing the two together to supply an even pressure to the cover and substrate. If desired, the peripheral lip of the cover may be modified to provide for an improved seal; for example, one or more continuous ridges can be incorporated into the lip so that the pressure supplied to the cover is higher at those locations and preferentially causes them to compress. In any of these embodiments, the reaction cell may be re-used, as the peripheral seal is temporary and the fastening means may be removed when desired. Thus, the reaction cell may be readily disassembled after use, cleaned, and re-assembled (with alternate components, such as a different substrate, if desired) so that some or all of the components of the reaction cell may be re-used.

This reaction cell interior height may range from about 0.002" to 0.02" (50 µm to 500 µm). The dimension of the cover, the peripheral lip, and the reaction area are such that the reaction area is generally in the range of about 4 mm$^2$ to 500 mm$^2$, preferably about 20 mm$^2$ to 350 mm$^2$, and the reaction chamber has a volume in the range of about 0.2 µl to about 312 µl, preferably about 1 µl to 200 µl.

Hybridization array 40 has a plurality of molecular probes bound thereto. Preferably, the molecular probes are arranged in a spatially defined and physically addressable manner, i.e., are present in one or more "arrays." In a most preferred embodiment, the probes are oligonucleotide probes (including cDNA molecules or PCR products), although other biomolecules, e.g., oligopeptides and the like, may serves as probes as well.

The term "hybridization" as used herein means binding between complementary or partially complementary molecules, as between the sense and anti-sense strands of double-stranded DNA. Such binding is commonly non-covalent binding, and is specific enough that such binding may be used to differentiate between highly complementary molecules and others less complementary. Examples of highly complementary molecules include complementary oligonucleotides, DNA, RNA, and the like, which comprise a region of nucleotides arranged in the nucleotide sequence that is exactly complementary to a probe; examples of less complementary oligonucleotides include ones with nucleotide sequences comprising one or more nucleotides not in the sequence exactly complementary to a probe oligonucleotide.

For use in hybridization, the interior of the reaction cell, in other words, the "hybridization chamber," is filled with a sample liquid comprising a target molecule which may hybridize to a surface-bound molecular probe, and with a surfactant of a type and present at a concentration effective to substantially reduce nonspecific binding and promote mixing of components within the sample liquid. The surfactant is selected from the group consisting of anionic surfactants, cationic surfactants, amphoteric surfactants, nonionic surfactants, and combinations thereof, with anionic surfactants and polymeric nonionic surfactants particularly preferred. Suitable anionic surfactants include, but are not limited to, the sodium, potassium, ammonium and lithium salts of lauryl sulfate, with lithium lauryl sulfate most preferred. A preferred polymeric nonionic surfactant is polyethylene oxide, with particularly preferred polyethylene oxides comprising an alkylphenol ethylene oxide condensate. Such surfactants may be obtained commercially under the trade name "Triton" from the Sigma Chemical Company (St. Louis, Mo.), and including, for example, Triton X-100 (octylphenol ethylene oxide condensate) and Triton X-102 (also an octylphenol ethylene oxide condensate). More specifically, Triton X surfactants have been described as having the formula:

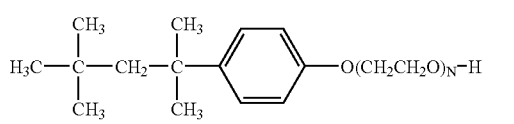
(I)

in which N for Triton X-100 has an average of about 9.5 units per molecule while for Triton X-102 N is an average of about 12.5 units per molecule. Further information on both Triton X-100 and Triton X-102 can be found at the following Internet addresses:

"www.sigma-aldrich.com/sigma/proddata/t6878.htm" and

"www.sigma-aldrich.com/sigma/proddata/t6878x.htm".

The surfactant generally represents between about 0.1 wt. % and 10 wt. % of the sample liquid, preferably between about 0.5 wt. % and 5 wt. % of the sample liquid, more preferably between about 0.75 wt. % and 5 wt. % of the sample liquid; however, it should be emphasized that the exact concentration will vary with the surfactant selected, and those skilled in the art may readily optimize the concentration with respect to the desired results, i.e., reduction of nonspecific binding and facilitation of mixing within the sample liquid. An exemplary sample liquid will contain between about 0.1 wt. % and about 1 wt. % of polyethylene oxide and between about 0.05 wt. % and about 1 wt. % lithium lauryl sulfate.

The invention is particularly useful in conjunction with substrate surfaces functionalized with silane mixtures, as described in co-pending, commonly assigned U.S. patent application Ser. No. 09/145,015, filed Sep. 1, 1998, and entitled "Functionalization of Substrate Surfaces with Silane Mixtures." That method provides a functionalized surface on a substrate with low surface energy. The method for preparing such a surface comprises contacting a substrate having reactive hydrophilic moieties on its surface with a derivatizing composition comprising silane-containing groups $R^1$—$Si(R^L R^x R^y)$ and $R^2$-$(L)_n$-$Si(R^L R^x R^y)$ under reaction conditions effective to couple the silanes to the substrate. This provides —Si—$R^1$ and —Si-$(L)_n$-$R^2$ groups on the substrate. The $R^L$, which may be the same or different, are leaving groups, the $R^x$ and $R^y$ which may also be the same or different, are either leaving groups, like $R^L$, or are lower alkyl, $R^1$ is a chemically inert moiety that upon binding to the substrate surface lowers the surface energy thereof, n is 0 or 1, L is a linking group, and $R^2$ comprises either a functional group enabling covalent binding of a molecular moiety or a group that may be modified to provide such a functional group.

The ratio of the silanes in the derivatizing composition determines the surface energy of the functionalized substrate and the density of molecular moieties that can ultimately be bound to the substrate surface. When used in conjunction with the present invention, the surface-bound molecular probes are bound to the $R^2$ moieties provided by the second silane-containing group. These and other variations upon and modifications to the disclosed embodiments are provided for by the present invention, the scope of which is defined by the following claims.

What is claimed is:

1. A method comprising the steps of:
   introducing sample liquid into a reaction cell having a hybridization probe array so that some interior volume is partially occupied by sample liquid and partially occupied by gas;
   centrifuging said sample liquid by rotating said reaction cell about a centrifugation axis so that centrifugal force in excess of 1 G urges said sample liquid against said array; and
   agitating said sample liquid in said reaction cell during said centrifuging by rotating said reaction cell about an agitation axis distinct from said centrifugation axis, wherein said agitation axis is more orthogonal to than along said centrifugal force so that said sample liquid moves relative to said array.

2. A method as recited in claim 1 wherein said agitating involves periodically changing the direction of rotation about said agitation axis so as to define an agitation cyde rate.

3. A method as recited in claim 2 wherein said centrifuging involves rotating said reaction cell during said agitating at a centrifuge rate greater than said agitation rate.

4. A metliod as recited in claim 1 further comprising a step of removing sample liquid from said reaction cell, said removing step involving rotating said reaction cell about said agitation axis so that said centrifugal force urges said fluid in said reaction cell away from said array.

5. A method as recited in claim 1 wherein said sample liquid occupies at most haff of said interior volume during said centrifuging and agitating.

* * * * *